US006427114B1

(12) United States Patent
Olsson

(10) Patent No.: US 6,427,114 B1
(45) Date of Patent: Jul. 30, 2002

(54) METHOD AND MEANS FOR TRAFFIC ROUTE CONTROL

(75) Inventor: Kjell Olsson, Järfälla (SE)

(73) Assignee: Dinbis AB, Jarfalla (SE)

( * ) Notice: Subject to any disclaimer, the term of this patent is extended or adjusted under 35 U.S.C. 154(b) by 0 days.

(21) Appl. No.: 09/762,477

(22) PCT Filed: Jul. 30, 1999

(86) PCT No.: PCT/SE99/01311

§ 371 (c)(1),
(2), (4) Date: Feb. 7, 2001

(87) PCT Pub. No.: WO00/11629

PCT Pub. Date: Mar. 2, 2000

(30) Foreign Application Priority Data

Aug. 7, 1998 (SE) .............................................. 9802695

(51) Int. Cl.[7] .................................................. G08G 1/01
(52) U.S. Cl. ...................... 701/117; 701/117; 701/119; 701/210; 701/25; 340/934; 340/995; 303/96
(58) Field of Search ................................ 701/117, 118, 701/119, 209, 210, 25, 26; 340/905, 995, 934; 303/96

(56) References Cited

U.S. PATENT DOCUMENTS 6,259,377 B1 * 7/2001 Noecker et al. ............ 340/933
6,304,816 B1 * 10/2001 Berstis ........................ 701/117
6,314,368 B1 * 11/2001 Gurmu et al. .............. 701/209

* cited by examiner

Primary Examiner—William A. Cuchlinski, Jr.
Assistant Examiner—Tuan C To
(74) Attorney, Agent, or Firm—Connolly Bove Lodge & Hutz

(57) ABSTRACT

The invention concerns a method and means for control of traffic on a network by route control. The method and the means are based on functions in a traffic management system. The invention includes control of traffic from a first route, which passes a bottleneck, which can be a part of the network, e g a node or a link, with low capacity relative to the demand of traffic through the node or the link,—to at least another alternative route. That alternative route is separated from the first route at a node upstream of the bottleneck and is routing at least parts of the traffic another road passing the bottleneck of the first route. The method is built on several cooperating method steps and route control can be applied on several different hierarchic levels in the network, locally and more comprehensive. Essential method steps are estimating and controlling traffic margins on selected links and nodes in the network and utilizing those margins at the route control. The invention concerns traffic control of vehicles on a road network as a first hand application. But the method can also be used for other applications, as traffic control of data packets on a communication network.

25 Claims, No Drawings

METHOD AND MEANS FOR TRAFFIC ROUTE CONTROL

SHORT INTRODUCTION TO THE INVENTION

The invention is a method and means for control of traffic on a network with route control. The method and means are based on functions in a traffic management system. The invention includes control of traffic from a first route, which passes a bottleneck, which can be a part of the network, e g a node or a link, with low capacity relative to the demand of traffic through the node or the link,—to at least another alternative route. The invention concerns traffic control of vehicles on a road network as a first hand application. But the method can also be used for other applications, e g traffic control of vehicles on rail networks, air traffic network control and sea traffic network control, and as traffic control of data packets on a communication network. This application is also treated.

BACKGROUND OF THE INVENTION

Field of the Invention and Description of the Related Art

Traffic volumes are large during rush hours and there are queues growing on the network in and outside large cities. It is difficult to find space for more roads and those is expensive to build. By use of advanced information technology the existing capacity of the road network can be utilized better and thereby larger traffic volumes can be handled with less additions of road capacity.

This is reflected in the large interest, which is devoted ITS, Intelligent Transport Systems, within EU, USA and Japan et al. during the nineties. How the solutions would look like is however unclear, and therefore large amounts of money is invested in research in the domain, and several different ideas are studied.

Traditionally people have tried to solve capacity problems in the road network, by building more roads or by taking actions in those points, where problems appear. If there are long queues on a road upstream an intersection, people are trying to increase the ability to pass through the intersection for the cars on the said road. This is the traditional way of looking on traffic problems. The problems consist of narrow sections in the road network. In those points traffic queues arise, and therefore people consider the solution being limited to an increase of the flow capacity in those points.

With a deeper knowledge of traffic, and traffic network characteristics, the traditional "point-oriented" way of work appears as superfluous and inadequate. Performed "solutions" may create larger problems than the problem they solve. An example is given below.

It is not unusual with queues on the entrance roads of the large cities during the rush hour. If a queue is arisen at a narrow section, e g at an on-flow link to the entrance road, and the ability to pass is increased in this point by e g adding an extra lane, the increased flow might be trapped in a new narrow section, whereby queues are built up there instead. Queues at the new spot might create larger problems than the queue at the former spot.

There is a need for a more system oriented way of work for solving "the ability to pass"—problems in a network.

Route control has traditionally been used for certain events, e g road works on a link, when traffic signs guide the traffic into other links around the link with road works, or e g when a larger accident occurred on a link, and the police is there directing the traffic to other links around the place of the accident. This cannot always be done free from secondary problems. If the roadwork or the accident is on a link with large traffic, the new appointed route might not have enough capacity to carry all the new traffic too, and long queues can arise. In large cities the road network is generally heavily loaded during rush hours, and incidents, which suddenly reduce the capacity of a busy link, might easily cause long queues. Those queues in their turns are blocking traffic also on other routes, why ability to pass would be strongly reduced for large parts of the network.

Traditionally route control has been used on corresponding point oriented ways as described above. When a problem appears in a point in the network, traffic is directed away from that point. Then the problem might be solved in that point, but traffic might cause worse problems on other points in the network.

There is a need for more system-oriented methods for solving traffic problems in a road network.

During the nineties the international investments on information technology for vehicle traffic, ITS, have given rise to some new concepts and ideas, of which some will be commented below.

Route management in the shape of DRG, "Dynamic Route Guidance", has been treated in ITS-projects in EU- and USA-research programs. (The inventor has taken part in such an EU-project). In the concept vehicles are equipped with navigation equipment, Neq, and a central system is supplying Neq with travel times for links in the network. Neq then can select "the best route", (e g the fastest) through the network. There still today is a spread opinion, that traffic thereby would perform in an almost "optimal" way with a minimum of queues. Superficially it might seam that DRG gets this function: If Neq selects the "fastest route", the vehicle would avoid places with long queues, and if many (or all) vehicles have got Neqs, the result would be that there never would be any long queues, as the vehicles then would select other routes, and that traffic would be distributed at the network in such a way that alternative routes would take about the same time. The road network would be utilized optimally and the traffic route control would be almost perfect.

Another discussed concept, called "Lisb" below, (probably from Siemens) has also equipment in the car, which is communicating with a central system. Here the idea is that the driver at start puts in his destination. The central system returns a route, which the driver would follow. At several positions (stations) along the road network, e g at intersections, there are local short-distance communication links for information transfer, where the vehicles identify themselves and when needed obtain an updated route.

An established opinion is that the central system, which knows the positions and destinations of the vehicles, can give each vehicle an optimal route. If many (or all) vehicles take parts in the system and the central system often is updated, the central system has "full control" of the vehicles and the traffic, and thereby can optimize the traffic on the road network. The road network would be optimally utilized and the traffic route control would be almost perfect.

The present invention is neither DRG- nor Lisb-concept. Those have problems or shortages, which probably don't appear in a superficial analysis, but will be commented below. It is the opinion of the inventor that traffic is a difficult domain. Most traffic systems (all that the inventor knows about except the inventor's) have fundamental shortages. The general shortage is that the systems are not considering the real-time and network characteristics of the traffic. The consequences will be that the systems would not operate in the way the system originators apparently have thought. The systems will not give any significant positive traffic function, but might even worsen the traffic situation.

The problem with the DRG-concept is related to the real-time requirement and the network characteristics. The central system sends the traffic information. Each vehicle, independent of each other, selects it route based on this information. Nobody knows what the summed traffic result will be. The central system doesn't know where the cars are, which routes they select and then cannot foresee or prevent that traffic problems arise, e g because too many cars are arriving in the same period to an intersection. If the central system were equipped with sensors on the road network, those would after a while measure the traffic effects from the individually chosen vehicle routes. Then traffic problems might already have arisen or are arising. When at last the central system got that information, then it can send new traffic information including those detected problems, whereby each Neq will choose its new route. Those having possibility, will probably avoid the known problem area. The new routes however aren't known or coordinated either, why problems now will occur on other places. The real-time requirement is put aside, as the DRG-system is too slow relative the traffic application, which is what the system should handle.

The network characteristics of traffic are put aside, as individual vehicles makes free route-selections, instead of a system performing route control based on coordination of traffic flows in a network.

In a known implementation of DRG (Socrates) the traffic feed back to the central system is not by road-based sensors, but of the vehicles themselves by sending messages telling the time elapsed in travelling a passed stretch. That means still longer time delay of the feed back, e g significant queues must have had time to grow before a vehicle later on can deliver information, which is proving a changed traffic situation.

The problems of the Lisb-concept are also found at another level. There it is required that in principal all vehicles must have the equipment and be connected to and operating in the system. Otherwise the central unit will not get the knowledge about traffic as it needs. That means that the system cannot be implemented in a small scale and be expanded successively. Also if more than half of the cars were included, which is an enormous amount in a large city, the unawareness about the routes of the others and their influence on the traffic flows would make route control meaningless of the known vehicles. Sure it is often only a few percent of the average flow on a first link that needs to be rerouted to another route, to get the average flow on the first flow to be below the capacity value of the link. So it is not the amount of controllable vehicles that is the problem, but the knowledge that is too small about the size of the traffic flows. The real-time requirements cause system difficulties also if all vehicles were in operation in the system. Let us assume that the system really would be able to give all vehicles optimal routes at the time t=t1. Those vehicles are spread over the whole network. During the next minute a large amount of new vehicles are starting their travel. They will arrive in intersections in time periods that already have been optimized for those starting earlier, t<t1, from more distant sources in the network, and so on for the next minute etc. Further more during those one to two minutes many things have happened during the travel of the vehicles through the network. Certain vehicles haven't arrived to an intersection in time for passage during the planned green period, but have to wait for the next, which might imply that a few seconds delay turns to 1, 5 minutes etc. That implies that for a period of a few minutes the whole system with lots of vehicles and their individual routes must be recalculated and optimized again for the new situation. Vehicles get new routes, which in the new perspective means that some of them wouldn't have driven the route they really did. Their real route is no longer optimal. Optimization for a new situation means that the historical routes no longer have their former optimality. The original route control can also be that mismatched to the new changed circumstances, that implies traffic collapses and queues which are difficult to correct. There also might have arrived too many cars in an area, causing blocking each other, and cars might be route directed, travelling criss-cross through the network, and absorbing more link capacity than what is effective.

When more links in an area of the network are heavily loaded, i e links are congested or at the limit of being congested, there is little space left for guidance of arriving traffic. Wherever the excess traffic is directed, traffic collapses and queues will arise, which makes the system sensitive. Different kinds of problems might occur, e g those mentioned above, that the system tend to guide cars crisscross in the network.

The real-time problem is mainly due to the system trying to control the routes of all cars from their origins to their destinations. In a large city travel times of 15 minutes to an hour are usual. That is a long prediction horizon, for control of e g a passage through an intersection, during the short intersection green period. During half an hour many things have time to happen in traffic in a heavily loaded network.

In spite of the large resources needed as equipment in all cars and perpetual comprehensive optimizing calculations, the system concept suffers from uncertainties and shortages, which anyhow might get the system to collapse and traffic to be blocked in the similar way as happens without the system. The concept is not automatically offering a solution on the mentioned fundamental traffic problems. Another solution is needed. The present invention is such a solution.

The present invention concerning route control is based on a new view on traffic and traffic problems, where real-time and network characteristics are distinctive features of a traffic management system's possibility to really manage managing the traffic. Background material is the Swedish patents and applications: 9203474-3, 9501919-6, 9602950-9 and 9800280-1. The first is about traffic predictions in a network, the second about detecting traffic disturbances, the third about traffic management on motorways, the fourth about traffic management on a network. The content of those papers is regarded known and described methods can be used together with the present invention in a traffic management system for control of traffic. The fourth paper contains much of the problem view and background also for the present invention. So that information is not repeated here. The fourth paper contains relatively more general methods for traffic control in a network, while the present invention is focused on route management, and therefore specially created methods.

BRIEF SUMMARY OF THE INVENTION

The method for route control of traffic on a road network is treating uncertainties in traffic. Uncertainties which are fundamentally inherent in the real-time and network characteristics of traffic. Uncertainties which the method handles by control of traffic margins. At rerouting a part of the traffic from a first route to a second route, one should know, if the extra traffic gets space on the second route. Uncertainties imply a need for margins to handle different kinds of deviations. If the flow, in spite of a low probability, grows too large, there is a need for margins within the traffic management, creating an ability to handle the situation without difficult consequences for the traffic. With storage spaces at the road network vehicles dynamically can be stored and released, e g the inflow into a link can exceed the outflow during a period. The margins for the route control in the management system are not only given by the difference between the capacity value and the current flow of the link. The total margin is given by the action possibilities of the management system. That includes actions as control of traffic margins and the flows on upstream links and nodes. Route control can also be performed at different hierarchic levels on the network:

Local level, concerning a local bottleneck.

Intermediate level, concerning a longer distance along a traffic route or a sub-area of the network.

Upper level, concerning route control between larger traffic routes or between different sub-areas in the network.

EXAMPLE ON THE UPPER LEVEL TRAFFIC CONTROL

The road network is unbalanced due to new traffic from new large village areas in a certain direction from the city. Redistribution from the roads with the largest demand to nearby road network, is increasing the efficient utilization of the network. More cars per time period can pass to their destinations Roadwork or accidents can reduce the capacity of an important traffic route during a longer time period. Then redistribution would concern large traffic volumes and long time periods, and probably concern several routes.

EXAMPLE ON THE INTERMEDIATE LEVEL

The unbalance is less severe or the disturbance has less duration. The redistribution can be handled within a smaller area, a sub-area.

EXAMPLE ON LOCAL LEVEL

An incident with short duration or traffic collapse. The redistribution can be handled in the close neighborhood. The short duration of the disturbance implies requirements on real-time performance for actions including route control.

Route control can also concern coordinating actions on all three levels.

If an accident happens, the first transient actions correspond to the dynamics on "local level".

The extent however requires a continuous route control over a bit larger area on the "intermediate level". The consequences grow and more general and long-lasting actions are taken on the "upper level".

DETAILED DESCRIPTION OF THE INVENTION

Example on problem domains, which are handled by the invention.

Blocking problems.

If there is a reduction of capacity on a first link, e g to 50%, the inflow to the link is limited through the upstream node to 50%, either because the queue on the link has grown up to the node, or because we have limited the flow upstream. If the queue is growing passing the node, reaching upstream links, their link flows are also limited to 50%. That means that all the three sub-flow (Le=left, Ri=right, St=straight across) on an upstream link are reduced to 50%, not only that sub-flow e g St, which has its route through the first link. The links directed to Le and Ri in the node, thereby also obtain lower flows, in spite of available free capacity. The queues can continue to grow upstream, through nodes and into further more upstream links. Still more links are blocked and the flows turn much lower than the capacity, why the queues are just growing further.

There are several methods to prevent the rise of such blocking. Here we will concentrate on route control.

If we in the example above can reroute 20% of the traffic flow with its route through the first link to the other exit links of the node, the total flow on upstream links will increase with 20%, i e not only with the rerouted flow (20% of the sub-flow St), but also with the same proportion for the sub-flows Le and Ri.

The rest of the 30% of the sub-flow St however would continue to build queues and block the flows on upstream links, which implies that 30% of the respective sub-flows Le and Ri cannot pass. If the traffic management can prevent the queue from growing up to upstream links, the sub-flows Le and Ri wouldn't be blocked. Then those sub-flows would pass with their original full strength.

Assume for the sake of simplicity that all sub-flows had equal sizes at the start, then we get the following four stages.
1. At first the flow was 100% through the upstream link.
2. Then it decreased to 50%, when the first link flow was reduced to 50%.
3. Then it increased with 20% to 70%, at the rerouting of 20% of St, i e 20% of ⅓, which means that about 7% of the total flow was rerouted.
4. Then the flow is increased with ⅔ of 30%, i e 20% to totally 90%, when 30% of St (10% of the total flow) was prevented from blocking the rest of the sub-flows.

The action of point 4 can be performed dynamically by storing the sub-flow St, where it is not blocking other sub-flows, on the discussed link and/or on upstream links. The action can also be taken by rerouting further upstream on the network. The first rerouting would e g correspond to route control at "local" level, and the other route control at the "intermediate" or "upper" level.

The end result in the example above would be that a possible capacity reduction to 50% on a first link would be avoided by the handling of local route control: First by implying a reduction of only 10% of the flow on upstream links, and then by a more comprehensive route control, that distribute that last 10% of the flow on the network. In the example this is performed without any large consequences for the travelers, no queues and no long travel-times.

This is strongly contrasting the alternative of doing nothing. Then large parts of the network links would get a reduced capacity of 50%, the queues becoming long as well as the travel times.

This result is usual in today traffic. People are talking about traffic infarct. It is simply too easy getting traffic collapse during rush hours.

As appears from the example the queues can grow very fast, and it is difficult to get rid of the problem, when it has started. If some part of the network got a strongly reduced capacity, the queues are simply spread, and it is not easy to break the negative development.

There are hard requirements on the route control methods to get those in operation, and to be able to sustain an effective traffic on a network. The methods according to the invention are used partly preventive, i e counteracting the rise of difficult traffic problems, and partly restoring, i e solving problem and restoring traffic to a more effective state.

One of the problems illustrated above was that a sub-flow was blocking the other flows. The queue on the link can be regarded as storage of vehicles waiting for leaving the link through the downstream node. The natural queue-state is that a car behind cannot pass a vehicle in front. The vehicles must leave the link in that order they arrived to the link. In the domain of computers such a storage is called FIFO, "first in first out". This function implies the said negative consequences, where the reduction of a sub-flow concerning a first route, can block large traffic flows on several upstream links.

The invention includes methods that handle the FIFO-problem.

A method is route control on a first link, which is threatened being blocked. Traffic is rerouted from the "reduced sub-flow" on the first link to other exit links from the downstream node. Hereby the outflow from the first link is increased.

Another method is that already upstream of the said first link, routing the said sub-flow to another route around the said first link. Hereby the inflow of the said sub-flow to the first link is decreased. Blocking can be avoided and by that also the outflow from the link will increase.

The FIFO-storage is reduced also by introducing other forms of storage space, e g storage pockets for selected sub-lows, implying that a sub-flow is not automatically blocking other flows.

It is included in the invention to perform the tasks concerning the real-time and network characteristics. That means that actions taken at one moment on one position on the network, will have consequences at later moments on downstream positions on the network. To avoid causing problem in traffic with an action, one needs to foresee the consequences of the action, not only at the point where the action is implemented, but also at other positions on the network.

In the invention the difficulty of the above tasks is utilized in a constructive way. When traffic problem is foreseen (predicted) to arise at a certain position, the possibilities are utilized to implement one or more actions on other positions on the network. And that is done in such a time ahead that those actions got time to work and reach effect at the said position, where problems otherwise would arise. In the invention there is therefore included methods predicting traffic on the network, and methods, which include actions, from which results are predicted on the network, and there are included methods which relate a problem to possible actions.

Predictions imply uncertainties. So it is not possible to know 100%, how the traffic will develop. With the methods of the invention it is however possible to estimate probabilities for different traffic states to arise. The invention includes methods that handle uncertainties and probabilities, and predict and control traffic margins on links and nodes of the network. Those methods partly include route control as a means to control traffic margins, and partly make route control possible by control of traffic margins.

Traditional methods, which don't consider the real-time and the network characteristics of the traffic, and therefore neglects the uncertainties of traffic control, appear to be rather naive, seen in the view of the present invention.

Knowledge problems in transport and traffic.

In today traffic situation the driver knows and determines his destination and his route individually. In doing this, he considers his knowledge about the traffic conditions. This knowledge is usually weak, and is based on experiences of the usual situation at that time of the day on those routes, where he is usually driving. When he is driving, he is only seeing the cars close around him, and knowing very little about traffic conditions, neither a distance in front of him, nor behind him nor on other roads on the network. His possibilities are small to avoid queues, places with accidents etc. and to find an effective route himself.

A traffic management system according to the principal design in the above mentioned patents, has good knowledge about how the traffic looks like on the network, can predict the traffic development and implement control actions to sustain good efficiency on the network. The knowledge is considered about how traffic flows are distributed on different links through the nodes. Individual handling of vehicles is not included, (if no corresponding extra function is included). The primary task of the traffic management system is not to manage an individual vehicle in the best way from start to destination. (The above mentioned Lisb-concept however was built upon that last function.).

Simply said, knowledge about traffic is in the management system, and knowledge about the individual transport (the route) is in the vehicle (i e the driver).

Earlier mentioned concepts have tried to collect information in either the management system or the vehicle. The above mentioned DRG-concept was built on the central system, transforming the information about traffic to the vehicle, and thus collecting the "total" information in the vehicle. Then the vehicle was finding its own way through the network. The above mentioned Lisb-concept was built on the central system receiving information from the vehicles, and thus collecting the "total" information in the central system. Then the vehicle was given his way through the network.

Both those concepts have their problems as described above.

Increased knowledge used in the right way provides advantages, why it is included in the invention to expand the basic methods with added functions, which can increase the ability of the management system to route traffic. The added functions usually require more resources and also imply larger costs. Below examples are given on additional functions applied in different ways.

At route control as in the example about blocking, one wishes to transfer a certain part of the traffic on a link to other routes. That can be done with VMS, "Variable Message Sign", which can give adapted messages using symbols and texts, and where the strength of the content implies different strong responses. The example below concerns the content, not the expression itself:

Reduced ability to pass, (direction St). Recommendation: Turn Ri.

Accident, (direction St). Recommendation: Turn Ri.

Direction X. Select road Y.

License-plate: End-no 7. turn Le:

Symbolic map showing the route around the downstream link.

Traffic lights, green arrows, dynamic road-signs, instructing about stop, drive and the direction etc.

Vehicles equipped with navigation equipment, Neq:, can help the driver to select a new route to his destination, if he chooses to turn according to the given instruction from TMS.

Vehicles also can have equipment that show (inform) TMS about their routes close ahead, their whole route or the destinations according to the examples below:

Blinkers at a given position show downstream direction.
Selection of positions in lanes show downstream route selection.
Symbol maps, e g at the back, show downstream route.

Information can be transferred by radio or local IR etc. Destination or part of route can be transferred to the management system. The communication can also be in double directions. TMS transfers instructions about routes to the vehicles. A Neq in the vehicle, which can communicate with TMS makes knowledge exchange possible. The communication media might be e g cellular mobile telephony.

The increased knowledge in TMS about local conditions in connection to the problem on a link, can be used for more accurate predictions and controls of traffic, including route control. The knowledge might concern downstream link selection in the closest nodes for vehicles on a link, and control possibilities can even include individually directed instruction to the Neq of the respective vehicle.

Route control is used here as a means for traffic control, i e a method for TMS to reach an efficient traffic on the network. It shouldn't be mixed up with transport control, where the route control is the individual control or selection of a transport route from start to destination. TMS uses route control locally, for selected parts of the network and selected time periods. If route control at any occasion is directed to individual vehicles, it is for solving traffic problems, and is concerning a certain part, the problem area, of the network. TMS primary task is the traffic, not individual vehicle transport and route selections from "origin" to "destination". Such an individual route control is generally done in the vehicle, and eventually with support from a transport management system.

Exceptions can exist, where e g alarm vehicles get information and possibly guidance from TMS about a suitable route, based on traffic conditions, and where TMS also can control the traffic in such a way that the ability to pass is improved for the alarm vehicle, (it is given "free space").

EXAMPLE ON EMBODIMENTS, BASED ON ADDED EQUIPMENT, NEQ. ETC, IN THE VEHICLE

With support from technical tools a manifold of variations can be made, based on the same main theme. Below it is given an illustrating example.

The vehicle has a navigation equipment, Neq., which can communicate with TMS in both directions, with TMS as a central unit or as a daughter unit, LTMS (Local TMS).

The driver feeds in his destination, possibly including preferences about route, e g by two "via"-points (E4 and Sveav.). Neq. has already got or might get boundaries by TMS. Neq. transmits the destination and the closest two passages of boundaries (d1 and d2). Position d1 might be the access to the closest larger traffic route, a motorway to the city. Position d2 might be the exit from the motorway and entrance road to a sub-area at the outskirts of the city.

TMS gets information from sensors at the network and has estimated how the traffic is and predicted how the traffic will be for different time moments. At least for sensitive parts of the network, TMS has calculated traffic margins. Threshold values for flows have been determined e g at motorway entrances. Threshold values can be a max, limit, based on certain prerequisites, or a target value related to rations. TMS can answer the vehicle e g according to the following:

Waiting time about 5 minutes // There are more vehicles than the ration, demanding the motorway access. (Route control at the "local" level).

Leaving an alternative route to Neq. // There is usually a large demand for that route. Waiting time is long, and the road network can be better utilized if a certain part of the traffic can be spread out on other parts of the network. (Route control on the "upper" level).

Ok. // It is ok to start. Further actions, if needed, can be made later on along the route.

The vehicle is travelling along its route. TMS has detected an accident on a first link, the accident blocking 50% of the link capacity. TMS has dynamically reduced the traffic on upstream links with routes towards the first link. A certain part of the close area traffic has been rerouted. (Route control on local level). Traffic margins are small on the closest alternative links, on which one was included in the said vehicle route. Among those vehicles travelling towards the critical area, the said vehicle is one of those most suitable to reroute. Destination information from the vehicles is background information for the decisions. (Route control on the intermediate level).

The added equipment in the vehicles implies that TMS gets more information, can reduce uncertainties and can operate with smaller traffic margins. Neq also implies a more simple work of the driver. Neq helps him by receiving route information from TMS, uses it to produce a new route, presents it for the driver, and helps the driver with information about when and how he shall turn off the road to another one. That presentation for the driver can be done that simple that the driver gets more time for driving and can concentrate on traffic instead of searching his way by maps, signs etc.

TMS can perform route control also if Neq is missing or two-direction communication is missing or both are missing. The communication from TMS can be done by using signs. The vehicle can make signals by other control means e g blinkers. The common factor for the route control is the use of the invented methods, in which there are included:

Considering the uncertainties.
Control of traffic margins.
Settings of threshold values e g in the form of rations.
Using upstream information for downstream predictions, and downstream information (including prediction) for upstream actions, possibly in several steps upstream.
Combinations of route control and storage control (buffer control).

Flow capacities, storage spaces, margins and threshold values can be determined theoretically, and successively updated during operation. Measurements and calculations from measured values are showing the capacity values in practice for respective link and node, the storage space and the margins needed to handle different operation states. Statistic data are showing the sizes of deviations and make possible the estimation of probabilities for interesting results. The use of different added equipment leads to other values on the mentioned parameters. But is not changing the fundamental method for route control, including the method of estimating and updating the values of the mentioned parameters.

The method with traffic margins and threshold values, e g rations, makes it also simpler to watch transients. To allow a link increasing its ration, i e take in a larger flow than its old ration, there is required that the downstream bottleneck e g the downstream node would be less loaded by one or more of the other entering links, whereby their rations are changed correspondingly. There is an inertia in the dynamic ration distribution, and in the use of traffic margins it is considered that changes in traffic is not larger and faster than there is time for actions to be taken limiting the increases preventing parts of the network to be overloaded. Traffic dynamics are kept on such a level that the action dynamics would be within time constraint. Simply said, the route control according to the invention will work for stabilizing traffic on a high efficiency level.

This function appears even more evident by the data packet network described below, where the time constant of feed back of results, evidently would be longer than natural transients of packet flow increases in the network, if the invented methods wouldn't decelerate the increase speeds. Further readings in that section.

Preferred embodiment of the invention.

The invention concerns a method in a traffic management system for traffic management on a road network consisting of links and nodes, where individual vehicles are travelling on the network according to the respective vehicle route, and the traffic management contains actions for control of vehicle routes, utilizing that there are more than one route from a given position on the network to a given destination. Characteristics are:

Threshold values are determined for flows of selected links and nodes, and are at least one of (k) and (l) below:
k. maximum allowed flow;
l. Given ration, where the ration can be corrected dynamically and redistributed between links;

and that flow margins are estimated for selected links and nodes being at least one of (m), (n) and (o) below:
m. difference between the flow capacities of respective link and node and the said threshold value;
n. difference between the flow capacities of respective link and node and their respective dynamic flows;
o. difference between the said threshold values of respective link and node and their respective dynamic flows;

and that the estimation of traffic margins includes flow margins and for at least one selected link there is included the estimation of the dynamic storage margin, Msi, of the link, i e the difference between the storage capacity, Si, and the utilized space, Spi;

and that control of traffic margins include control of flows on the said at least one selected link, utilizing Msi and the dynamic difference between the time dependent in- and outflows of the link;

and that measurement values on flows at operating conditions are used for updating a selection of the said capacity-, margin-, threshold- and ration values;

and that the traffic management control vehicle routes with coordinated actions concerning the control of traffic margins and route control;

and that the route control includes control of traffic from a first route, where the estimated demand for capacity on any part of the route is larger than the given threshold value, i e the demand margin grows negative, to at least one of (a) and (b) below;
a. to an alternative second route, where the estimated demand for capacity is lower than the given threshold value, i e the demand margin is positive;
b. to an alternative third route, where traffic is estimated to be larger than the threshold value, but the traffic problem is estimated to be less serious than on the first route;

and that bottlenecks are identified along one or more routes, where a bottleneck has got a small demand margin, which also is less than the demand margin of the closest upstream links and nodes;

and that for at least one of; measured, calculated and predicted small demand margin at a bottleneck, the traffic management is estimating the demand margin of selected links and nodes on at least one alternative route with upstream deviations from the first route through the bottleneck, for a combined control of at least two traffic flows, utilizing at least one alternative route and control of traffic margins on selected links of the first route and on selected links of the selected alternative route;

and that controls of traffic margins for at least one selected link include control of traffic flows through at least one of (c), (d) and (e) below;
c. upstream node;
d. at least one link upstream the upstream node;
e. at least one node upstream the upstream link;

and that route controls concern at least one of the following levels; (f), (g) and (h) in a hierarchy of the network;
f. locally, avoiding a bottleneck, including a bottleneck dynamically created by an incident;
g. the intermediate level, concerning a longer stretch of traffic route, including a stretch of at least four nodes, or a sub-area of the network;
h. the upper level, concerning route control between larger traffic routes and different sub-areas in the road network;

By demand for capacity it is not meant that the vehicles actually would bring forward a request for capacity, but a more general meaning that TMS e g by prediction of traffic, is finding that the predicted flows would be of a certain size, corresponding to a "demand". Those predicted flows can be regarded larger than a link capacity or threshold value by TMS, whereby "the expected demand margin" would be negative, i e the flows would be "too large" to be contained within given limits.

By estimating a parameter is meant a determination, often a calculation, of the parameter value. The estimation can concern a future value and be a prediction. The estimation can also concern a present or historical value, and the same or similar algorithms can be used as at the prediction. Here estimation has implicitly got the meaning that the value has not been directly measured, and might differ from the real value. At a prediction it might e g later on be possible to really measure the real value of the parameter, and then we got two values on the parameter, which can differ. In the invention it is included doing estimations and handling uncertainties. Several parameters values can be compared with new measured or calculated values from the new measured values. That can be done during the system operation and for different traffic situations. Thereby parameter values for different situations can be determined and successively updated. It is also possible to determine averages and variations, e g standard deviations of the parameter values. From statistical rules and correlation also probabilities can be estimated for traffic parameters falling into different value intervals, e g the probability that a predicted flow value, in reality would be more than 20% larger. (Information about the basics for that technique is to be found in the referred patent papers). The knowledge about the uncertainties of the estimated values is used in the invention to determine threshold values and margins. If the probability is large for a flow being 20% larger than the predicted value, traffic margins and threshold values are determined in such a way that the deviation (uncertainty), can be handled by the management system. Route control is an action, which together with control of traffic margins makes an efficient traffic control possible in an environment, characterized by uncertainties.

What is said above can be exemplified in the description below of an embodiment of the invention according to a method, where a first route is analyzed together with alternative routes for the whole or parts of the first route, for rerouting of parts of the traffic from the first route to at least one of the alternative routes, characterized in that route control is done according to the following steps, where index i can identify different links in the different steps (a), (b) and (c).

a. the flow Ipi is predicted on link (Li), with storage capacity Ci, and prediction uncertainty dlpi being estimated.

b. the storage of vehicles Spi is predicted on a link (Li), with storage capacity Si, and uncertainty dSpi is estimated c. dynamic traffic margins Mi for the inflow on link (i) consists of a combination of traffic margins Mii, which is estimated from Ipi relative Ci, and selectively the storage margin Msi, which is estimated from Spi relative Si.

d. a bottleneck is identified for a node (Nb) and/or a link (Lb), where a bottleneck in the node Nb implies that at least one upstream link Lb would be a bottleneck, and at least one route through the bottleneck is identified as a first route (Rf), containing a bottleneck.

e. the steps (a, b, c) above is done for the route (Rf) with the link Li, i=b, and selectively for upstream links (i=b−1, etc.), and for at least an alternative route (Ra), which is deviating from (Rf) at a node (Na) upstream (Nb) or (Lb) and with the link Li, i=a+1, and selectively downstream links and nodes (i=a+2; etc.).

f. a decision on action (AR) for control of a certain flow, I(Ra, Rf), from (Rf) to (Ra) implying that I(Lb) decreases and I(La+1) obtains a rerouted flow.

g. the decision in point (f) above aims at improving traffic on the network and selected criteria for decision therefore should at least be based on a limited analysis on selected links and nodes at an extent corresponding to at least one of the conditions g1–g4 below;

g1. the predicted flow margin MI on selected links of Ra is estimated to handle the rerouted flow I(Ra, Rf) during a selected time period.

g2. the traffic problems on selected links of Ra and Rf, after rerouting, are estimated to be less than the problem of Rf without rerouting.

g3. the predicted storage margin MS on Ra together with Mi on Ra are estimated to handle the rerouted flow I(Ra, Rf) during a selected time period.

g4. uncertainties in predictions and variations of flows imply uncertainties of results of route control actions AR, and if the result would be worse, in spite of selected criteria for the decision in point (f), than a given condition, step (h) below is done;

h. at detection, estimation or prediction of problems with route control actions (AR), there is done a selected analysis of the step (a, b, c) above for upstream links for selective action (AL) for upstream limitation of flows to the problem area, where AL selectively utilizes the dynamic margins of the analysis at the implementation of the flow limitation.

i. selectively the point (h) is combined with corrections or additions of route control actions AR.

Distribution of TMS.

TMS is working on different hierarchic levels. TMS can also work distributed over the network. Parts of TMS, LTMS, can have part-responsibility for a part of the network, e g a sub-area, a corridor of entrance roads, or a motorway with its connections. LTMS can also be distributed physically in such a way that a LTMS is positioned in connection with its area of responsibility. (For data packet network it is practical with a physical distribution of LTMS also to individual nodes, see the next section).

In addition to control of traffic within its area, LTMS also will handle traffic in and out from the area. A basic principle is, not to let in more traffic in the area than can be handled efficiently. Connections with other areas are passing responsibility boundaries. Naturally a first responsibility area "wants" its "out-traffic", automatically implies a limitation of the first area out-traffic. The first area is adapting its traffic control, by e g storing traffic, route-controlling traffic to other exits or limit the in-traffic to its area. If fewer vehicles can leave the area, fewer vehicles is let in, otherwise there is easily obtained queues and blocking of links in the area. Uncertainties of traffic estimations are considered by control of traffic margins and threshold values, e g rations. The second area can give the first area rations for its exits to the second area. The first area transfer predicted out-flows ("demands") for capacity to the second area. The second area treats arriving "demanded" capacities at prediction and control of its traffic, and performs possible redistribution of in-flow rations, which is notified the first area and so on. TMS is controlling the cooperation of LTMSes and contributes by route control on the upper level between different areas. (This is further discussed in the section about packet networks). Also if TMS is not physically distributed in different LTMS, the organization of the control can be done in a corresponding way. The principle of predicting downstream from upstream information, and feed back upstream for actions, e g by rations, can be independent of the TMS organization. The network dynamics of traffic implies that local changes can be handled in short time periods and with large dynamics, while more comprehensive changes over larger parts of the network can be treated in longer range terms over longer time periods.

Control of datapackets on a communication network.

Control of telecommunication originally consisted of setting up a total connection from the source to the destination. The connection might consist of assignment of own physical wires, on which information was transferred. The technology has been developed. Several channels might use the same wire. The transfer speed has increased. With fibers speeds of Gbits/s can be reached. That means that an information packet of 1 million data-bits needs less than a thousand of a second.

It also means that the method of setting up and close a totally own connection would take long time. Packet networks are based on the concept that every data packet has got an address field, which makes possible to send the packet on the network along a selected link to its node, where the address might be read and the packet being further transferred on an exit link and so on.

The packet might get its total route determined at the source, i e the route of the packet is equally determined as if the network first set up a connection for the whole passage.

If every source transmits the packet the closest route to the destination, it might happen that there are too many packets arriving at the same time period to a node. The node has not got time to distribute all the packets further downstream. There might be narrow sections, bottlenecks, on the network, which limits the amount of packets that can be transmitted. By often transmitting information about the load of the network back to the source, the source can transmit packets on other routes, when the source got information about a route being overloaded.

In the same way as at route control of vehicles, the traffic control of data-packets is related to uncertainties. There is a time delay before the source get information about problems. What has happened in the meantime? Would problems even increase because of the selection of new routes? In the same way as for the vehicles, the packets have knowledge about their address, but no knowledge about the traffic on the network. If traffic is dense there is a need for knowledge about the traffic to control the routes of the packet. There is a requirement for a traffic management system to control traffic on a data-packet network.

In the same way as for vehicle control there is a need for route control on several levels, locally and more comprehensive. Because of the high speed of the data packets there is growing importance for the management system having functions distributed at the network nodes.

Also here the real-time and the network characteristics are essential and the ability considering uncertainties in predictions and actions is determining the ability of the traffic control methods creating positive effects in the traffic.

Blocking problems at FIFO-storage of packets cause corresponding consequences as at vehicle traffic.

It might appear as if the handling of traffic at the nodes makes the methods of packets and vehicles controls different. Let us study some principles. Packets are arriving to the node on an access link and are waiting for their turn to pass. The node is deciding when, reads the packet addresses and transmits the packets on the corresponding exit links. Vehicles are arriving to a (node) intersection on an access link and are waiting for their turn to pass. The node is deciding when, and the drivers know their exit links.

If the Node and the Driver both know equally little about the future traffic downstream, their route selection would be equivalent.

Sensors and separations of the lanes for different directions, offer also a road network node possibilities for information about the vehicle selections of exit links.

The traffic management system including the subsystem in the Node can be given knowledge about downstream traffic conditions on the network, and can take actions as route control and storage at the node, respectively connect information upstream, possibly in several steps, for upstream route control and storage.

Of course there is a large difference in relative information velocity between the different networks. Information about vehicle traffic is transmitted on a tele- or data-communication network e g a data packet network. Here information travels very fast, much faster than the velocity, with which the vehicles are travelling on the road network. Time spending for transmitting information can be neglected relative to other characteristic time duration on the road network. TMS can have almost "simultaneous" information about traffic from all parts of the network. For the data-communication network the traffic information is transmitted on the same network (or an equivalent). That implies that traffic messages is travelling with the same packet speed as the data-packets. TMS in a node can have information of current interest about itself, while information about further distant nodes successively grows older and older. Nodes are updated successively about traffic on downstream nodes, by the nodes sending information packets upstream. A source has got fresh information about its closest nodes, while information is older for nodes closer to the destinations. A source needs a prediction on the traffic on the network, to judge the possibility that the packet "would be able to travel ahead" along the route when the packet is sent. Uncertainties as well as the control methods are the corresponding ones as for the vehicle traffic. When a vehicle is leaving its "source" (is starting), the uncertainty is also larger about what the traffic would be closer to the destination, when the vehicle will be there. Traffic control according to the invented method, is required at several levels, locally as well as more comprehensive.

The demand for network services in one or more sources can appear suddenly, when several clients at the same moment desire (demand) transfers of large data volumes. Control of traffic margins and assignment of rations, are limiting the possibilities of the sources to transmit uncontrolled large data volumes on to the network. Sudden volume changes would rapidly be able to overload the network, and it takes time before information about the results at distant nodes will reach the source. Meanwhile further large volumes might have had time to be sent on to the network, if the methods of the invention didn't control the increase speeds to manageable levels.

TMS, which constitutes the composed traffic management performed at nodes (including sources), manages what is done where, according to the methods of the invention. E g information packets can be transmitted by the sources to the nodes on the network, containing information about known future and expected, predicted, traffic volumes. Nodes can put together arriving "demanded" capacities to new traffic predictions, possibly redistribute rations and send responses upstream. Nodes are also sending information further downstream for further treatment at downstream nodes.

The fundamental characteristics are the following:
Predictions of traffic flows, "demand"-information, are running downstream, based on information at nodes, e g from sources.
Information about limitations, rations, e g based on detected overloading, is running upstream.

The node obtains an image of limitations of flows downstream, and demands upstream. The node perform according to TMS its part of the traffic management with control of traffic margins and route control, and forwarding information downstream and upstream.

The control of traffic margins considers the degree of uncertainty of estimated values. That control results e g in a stabilization of traffic, when the network is strongly loaded. Large fast demand increases get a limited penetration.

The principle is that the signal dynamics (traffic) on the network (including the input signal dynamics) are adapted to the control dynamics of the network (TMS).

Of course there are always risks and probabilities that the traffic control according to the invented methods, anyhow might turn into traffic collapse. It is even possible to determine control margins and threshold values in such a way that a predetermined probability exists for collapse. When a collapse occurs, the invented methods are also suitable for removing the collapse and control the traffic to return to a more efficient traffic state.

There are obvious differences in the prerequisites between data packets and vehicles with drivers, which are outside the method area of the invention. If e g there is a problem with a data packet the system "might throw it away", and the source can send a new packet. Humans in systems cause other special requirements.

At presentation of information for the driver, one should in the best possible way select designs, which encroach little on the primary attention of the driver, i e the attention on the close traffic. Information on external signs should be simple, clear and be able to be apprehended fast. Route control information is most safely transferred at a situation, when the vehicle is "stored" (standing still). Then even more complicated information can be transferred from external signs. Another way is first transferring information from TMS to equipment in the vehicle. After that the vehicle equipment can present the information in a suitable way, e g with help of sound (speech), and give the driver more time to select when he will see, listen, study and possibly get information repeated.

However considering route control and the invention, the same basic methods can be used for packet and vehicle control. That is seen also when the invented methods are described in more detail. There is equivalence according to the following:

traffic management is concerning data packets, instead of vehicles, the network is composed of communication network, instead of road network, links are communication links, instead of road links, the nodes is composed of means, which distribute data packets from access links to respective exit link according to the respective vehicle route, instead of being a connection node for road links, the means of the nodes can be equipped with large data storage capacities, and there can be included in the link storage capacity Si, such storage capacity, which is included at the node and statically or dynamically is assigned the data flows of the link.

The equivalence appears also in the example below, concerning: "Preferred embodiment.", where in the section above, vehicle control is treated. There the first four lines in the beginning of the above section are changed to the following:

"The invention concerns a method in a traffic management system for traffic management of data packets on a communication network consisting of links and nodes, where the nodes are composed of means, which distribute data packets from access links to respective exit link according to the respective data packet route, and the traffic management contains actions for control of data packet routes, utilizing that there are more than one route from a given position on the network to a given destination. Characteristics are:"

Then the following characteristics can be identified as characteristics also for the data packet application.

EXAMPLES ON CLOSE APPLICATIONS

In the text above two examples on applications of the invented method have been presented in more detail, i e road traffic and data packet communication. Then the inventor finds it obvious that the invention can be used also for other network traffic applications, e g traffic on rail networks, air network traffic and sea network traffic. Thus the claims should be correspondingly applicable also for such other network traffic applications.

What is claimed is:

1. A method of a traffic management system for control of transport units, TUs, as vehicles (e g for roads, rails, air or sea) or data packets on a network as e g a road network for road vehicles and a data communication network for data packets, and where the network is consisting of links and nodes, where individual TUs are travelling according to the respective TU's route, and the traffic management system provides actions for control of routes of TUs, utilizing that there are more than one route from a given position on the network to a given destination, and that the route control includes a route control process, where a narrow section on a first route is estimated having less capacity than the traffic demands, and where an alternative second route, at least excluding the said narrow section, is identified and estimated to be able to handle an added flow, reducing the flow of the first route, and based on the said estimations an action is selected to control process includes keeping a large capacity on the second, and that the goal for the route control process includes keeping a large capacity on the network, avoiding or reducing traffic collapses and blocking of traffic flows, comprising:

a. a route control process handling the inherent variations of the traffic, including determination of traffic margins, where a traffic margin for a link or node includes at least one of a flow margin, MF, and a storage margin, MS, where:

a1. MF constitutes a margin, which is related to the difference between the flow-capacity, C, of a part of the network and the considered flow level at the same said part, and a2. the storage margin MS is a measure on the remaining storage possibility of TUs, which can be utilized at a part of the network, b. selecting flow threshold values, TFs, at various parts of the network, and comparing a TF with an estimated dynamic flow demand, DL, on the same part of the network, and for DL growing larger than TF, the difference, MD, between TF and DL will grow negative, and control processes are selectively initiated, including control of traffic margins at a part of the network according to at least one of (b1–b4):

b1. considering the flow level TF, a corresponding MF is related to C-TF, and from that MF-level MF might be decreased, utilizing possibilities to increase the flow above TF on the said part of the network, b2. decreasing MS by storing TUs, utilizing possibilities to increase the input flow above the output flow, b3. handling peaks in DL variations, which give rise to negative MDs, by using (b1) or (b2), and utilizing possibilities to increase the respective MF or MS at smaller input flow demands, b4. controlling the traffic margins while dynamically increasing MD by increasing TF or changing a part of DL at the said part of the network to another part of the network, c. controlling the flow on the network concerning the said TF levels, and that predicted or estimated negative demand margin, MD, is detected for a first link or node on a first route for a time period, tnd, and that the traffic management system supports at least one of control of traffic margins according to (c1) and route control according to (c2);

c1. the said negative MD is handled on the said first link or node by decreasing traffic margins for the link, c2. the demand margin is increased on the said first link by a process comprising an identification of a second alternative route, with estimated large enough demand margins for receiving an added sub-flow for the concerned time period, and rerouting a corresponding sub-flow to the second alternative route from the first.

2. A method according to claim 1, comprising:

supplementing the method sub-step (c2) with at least one of (c3), (c4) and (c5):

c3. a limiting demand margin of the second alternative route is handled by decreasing the traffic margins for the limiting links or nodes of the route, c4. the demand margin is increased on the said second link by a process comprising an identification of a third alternative route, with estimated large enough demand margins for receiving an added sub-flow for the concerned time period, and rerouting a corresponding sub-flow to the third alternative route from the second or first, c5. the sub-step (c3) or (c4) is performed for one or more further alternative routes.

3. A method according to claim 1, including handling of dynamic uncertainties in estimations on traffic parameters, where relative deviations from the real parameter values are dependent of the length of the studied time period, comprising:
   a. analyzing at least one group-member's predicted or estimated values from a group consisting of: predicted and estimated traffic flows, estimated and given flow capacity values, estimated and predicted storage margins, estimated and predicted values of said MF, MS, C and DL and estimated and predicted effects, AR, of route control actions, for deviations from the real values respective effects of the said group-member, and
   b. utilizing that uncertainties about the real values of the group are influencing the uncertainties in the route control process and thereby the estimation of involved margins, and
   c. estimating the uncertainties of the route control process by comparing estimated values on selected parameters with resulting values on the said parameters based on measurements during the route control process, and
   d. limiting the size of the uncertainties by successively updating parameter values of the route control process based on the said comparisons.

4. A method according to claim 1, comprising:
   a. utilizing that said parameters for margins, thresholds, capacities, and levels, including the said MF, MS, C, DL and TF can be related to each other and be expressed in different ways, and
      a1. including such ways and equivalent parameters in method steps, which are similar or equivalent with the corresponding method steps in claim (1), where the following is one example: a method step requiring that the flow on the network is controlled concerning a TFM level, which are related to needs for traffic margins, where a margin, MTF, is C-TFM and is based on a need originating from uncertainties in estimations of traffic parameters, including at least one of the parameters of the said group of MF, MS, C, DL and TF or an equivalent group, which are involved in the route control processes, and
      a2. estimating uncertainties in the method steps based on deviations between estimated and real values, where the uncertainty values are estimated according to a selection of a group of deviations, where the said group can consist of various types of deviations, ranging from individual parameter deviations to a complete deviation for a whole route control process, and
      a3. updating the estimated uncertainty values using an updating process on a selected group of deviations, and at the updating of said estimations, preferably using statistical methods to determine sizes of critical traffic margins dependent on the probability for the deviations in the route control process exceeding the traffic margins.

5. A method according to claim 1, where a first route is analyzed together with alternative routes of the whole or parts of the first route for rerouting of parts of traffic from the first route to at least one of the alternative routes, comprising: performing route control according to the following steps, where index i can identify different links in the different steps (a), (b) and (c);
   a. the flow Ipi is predicted on link (Li) and prediction uncertainty dIpi is estimated, and the flow capacity Ci and the threshold value TF are determined;
   b. the storage, Spi, of the transport units TUs is predicted for link (Li), with storage capacity Si, and the uncertainty dSpi considered;
   c. dynamic traffic margins Mi for in-flow on link (i) is constituted by a combination of the flow margin MFi, which is estimated from Ipi relative at least one of Ci and TFi, and selectively the storage margin MSi, which is estimated from Spi relative at least one of Si and a threshold value, TSi;
   d. a bottleneck is identified for a node (Nb) and/or link (Lb), where a bottleneck at the node Nb implies that at least one upstream link Lb would be regarded a bottleneck, and at least one route through the bottleneck is identified as a first route (Rf), containing a bottleneck;
   e. the steps (a, b, c) above are performed for the route (Rf) with the link Li, i=b, and selectively for upstream links (i=b−1; etc), and for at least an alternative route (Ra), which deviates from (Rf) at a node (Na) upstream (Nb) or (Lb) and with the link Li, I=a+1, and selectively downstream links (i=a+2; etc) with nodes;
   f. decision on action (AR) for control of a certain flow, I(Ra, Rf), from (Rf) to (Ra) implying that I(Lb) decreases and I(a+1) obtains a rerouted flow;
   g. decision in point (f) above is aimed at improving traffic on the network and selected criteria for decision are based on an analysis on selected links and nodes with an extent corresponding to at least one of conditions g1–g4 below;
      g1. the predicted flow margin MF on selected links on Ra is estimated to handle the rerouted flow I(Ra, Rf) during a selected time period;
      g2. the traffic problems on selected links on Ra and Rf, after rerouting, are estimated being less than on Rf, without rerouting;
      g3. the predicted storage margin MS on Ra together with MF on Ra is estimated to handle the rerouted flow I(Ra, Rf) during a selected time period;
      g4. uncertainties in predictions and variations in flows imply uncertainties in results of route control actions AR, and if the result would be, in spite of selected criteria for the decision in point (f), worse than a given condition, step (h) would be performed below;
   h. at detection or estimating or prediction of problems with rerouting actions (AR), analysis of the steps (a, b, c) above is performed selectively for upstream links for selective action(AL) for upstream limitation of flow to the problem area, where AL selectively [] utilizes the dynamic margins of the analysis at the implementation of flow limitation; selectively point (h) is combined with correction or addition of route control actions AR.

6. A method according to claim 1, concerning route control on local level, where the analysis and the route control actions are limited to the links closest to the bottleneck on the first route, Rf, and the closest links on the alternative route, Ra, comprising:
   a1. using a local control process operating close to the narrow section, and handling short term traffic variations by control of flows and traffic margins,
   a2. including short time periods in the predictions in the analysis, corresponding to the transport travel times of the links, or to the traffic control period of the nodes or shorter intervals, and
   b1. analyzing the dynamics of the traffic flows in the said short time periods out from a selected link and in to selected downstream links, and including the flow of the node from the selected link in the traffic management, and
   b2. controlling flow from a link on Rf to a link on Ra by the route control process, including prediction, control and follow-up of the traffic for the said short time periods.

7. A method according to claim 1 for route control at sub-area level, where a sub-area is identified as the sub-area within which route control is done regarding flow at the concerned narrow section, and where the sub-area is a larger area of the network than the local area, comprising:

analyzing possibilities to redistribute the flows on the sub-area network, and concerning possibilities to reroute flows already before they have reached the local area, performing route control over longer distances and with connected uncertainties over several links and nodes, whereby the concerned time periods grow longer and the route control includes longer traffic variations with longer time perspective for implementing and continuity in route control actions, and handling short-term dynamic changes selectively with other actions, including local traffic control and upstream flow limitation.

8. A method according to claim 1, comprising:

controlling network on an upper level, where the network includes several sub-areas and connections between those, and doing route control on the network considering flow at the sub-area with the concerned narrow section, and rerouting the concerned flows already before they have reached the sub-area, and including analysis of large distances to the narrow section for route control of larger traffic volumes during long time periods, and analyzing strong loads of the concerned sub-area, and directing flows around or away from the sub-area by the network control and thereby creating more space for route control at local and sub-area level, and handling short-term dynamic changes selectively with other actions, including local traffic control and upstream flow limitation.

9. A method according to claim 1, comprising:

at least one (a) and (b),
   a. constituting a first traffic margin including a first flow margin up to the level when traffic collapses and queue starts to grow, and the capacity being the free-flow capacity,
   b. constituting a second traffic margin including a second flow margin up to the level when a queue has started to grow, and the capacity is determined from the queue-flow capacity.

10. A method according to claim 1, comprising;

estimating a first storage capacity Si from how many transport units TUs, that can be stored without stored TUs blocking any exit flow from the link, and estimating a second storage capacity Si from how many TUs that can be stored at the link, including those blocking the exit flows.

11. A method according to claim 1, where a flow of a link composed of sub-flows, where a sub-flow can concern a given route or traffic at a given direction at a downstream node, characterized in;

that there is defined at least one of traffic margin, flow margin and storage capacity for at least one sub-flow on the link.

12. A method according to claim 1, where transport units TUs on an access link are stored for further transport through a node to an exit link, comprising:

arranging the storage capacity Si for a link to be at least partly non-FIFO, whereby FIFO is meant that first in is first out from the link, and controlling traffic, utilizing control possibilities to sustain large sub-flows on the link for other routes, while a first route with limited exit flow from the link is controlled by storing TUs without those TUs blocking the said other routes.

13. A method according to claim 1, where the traffic control includes a function which limits the speed, with which the traffic flows are allowed to grow on the network, comprising:

a. supplying flows in a first node to the downstream links, limiting flows to ration values, FRn(t), which are updated in time, and said ration values are estimated using information about downstream loads, FLn(t), of links and nodes and the demand on flow levels, DL1(t); and b. increasing the ration values when they are lower than the demand and the traffic loads are lower than selected flow level values, FCn, which have controlled margins up to the respective flow capacities; and limiting the increase rate of ration values, in such a way that sudden large increases of demands are resulting in successive smaller increases of the rations in time, and that thereby response times are obtained for the network and that those response times and traffic margins are adapted to give time for route control to be initiated and performed for avoiding overloading of parts of the network; and c. analyzing demands exceeding the rations on various positions on the network, regarding routes from TU-sources to their destinations, and utilizing information about the demands as input for estimating or predicting downstream flows; and d. including the said estimation or prediction of flows at updating estimated or predicted demands on the network.

14. A method according to claim 1 concerning vehicles, in which there is equipment, whereby information about routes can be transferred in a form, which in a continuation can be utilized by the traffic management system, comprising:

including information, which at least is concerning direction at the closest downstream node, including information, which is used by the traffic management system at estimation of traffic flows into downstream links, using the said information for decreasing uncertainty in the flow estimations at traffic control, utilizing smaller traffic margins.

15. A method according to claim 14, comprising:

including information concerning the route on several downstream links, which is further decreasing the uncertainty at prediction of downstream link flows, utilizing the decreased uncertainty regarding several downstream links for an improved control of future conditions and selection of actions on several links upstream a link with predicted traffic problems.

16. A method according to claim 1 concerning vehicles, in which there is navigation equipment, characterized in;

that the traffic management system is giving control information concerning route control in a form that in a continuation can be utilized by the navigation equipment in the vehicle for providing a new route.

17. A method according to claim 1 concerning vehicles, characterized in;

that a guiding principle at the traffic control is not to let in more traffic into a part of a road network, than what the said road network part can handle, and with a part of a road network it is meant at least one of (a)–(e) below;

a. a road network, including networks separated as different responsibility areas;
b. a larger traffic route, motorway etc.
c. a sub-network, with interfaces through given access and exit roads;
d. a road-link, including downstream node;
e. a node;
that control for limitation of the in-flow at the connection of the road network part is selectively arranged according to at least one of the following alternatives (f)–(i);
f. at the said connection;
g. at least at one upstream link or node;
h. at least at one of links and nodes in position several steps upstream;
i. a selected combination of (f), (g) and (h);
where the limitation at (f) is analyzed regarding further control actions in a short term and distance perspective, while (g) and further (h) are analyzed regarding longer time and distance perspectives in prediction and control processes,
that there is route control of traffic flows around or from a road network part, into which the in-flow is limited, to another road network part, which has got capacity for larger in-flows.

18. A method according to claim 1, for traffic management of data packets on a communication network consisting of links and nodes, where the nodes are constituted of means which distribute data packets from access links to respective exit link according to the respective packet's route and the traffic management contains actions for control of packets' routes, utilizing that there are more than one route from a given position on the network to a given destination, comprising:
   transferring information about traffic on the network with corresponding speed as the speed of transport units, i e the data packets, where the said information is transferred in the form of data packets on the same physical network or by an alternative method, where some route control is distributed to nodes in the network, and
   utilizing local area control with fast information transfer between neighboring nodes for handling short term traffic variations considering small traffic margins, and
   utilizing route control on sub-area level for unloading the local route control of a narrow section on its local network from longer term traffic peaks, by allowing little more time consuming information transfer between nodes within the sub-area and corresponding longer or more complicated rerouting of routes, and
   utilizing route control on network area level for still longer time perspective, allowing corresponding time periods for information transfer and rerouting of routes within its action area, and for unloading strongly loaded sub-areas from corresponding longer term traffic peaks.

19. Means for performing the method according to claim 1 in a traffic management system for traffic management on a road network consisting of links and nodes, where individual vehicles are travelling on the network according to the respective vehicle's route and the traffic management provides actions for control of vehicle's routes, utilizing that there are more than one route from a given position on the network to a given destination, and supplementing the basic means of the traffic management system with road based sensors and control means, comprising:
   a. computer units, which include processes for route control and control of traffic margins, and that central computer units for superior control of network or sub-areas alternatively can be replaced by or supplemented with distributed functions in local computer units at the nodes of the network, and that control information is communicated between computer units;
   b. control means, which get information from control processes in computer units and provide route control information for further use by TU, including the drivers of the vehicles;
   c. sensors, which obtain information about vehicles at the connections with nodes, and that this information is communicated to control processes in computer units;
   and means for control processes comprising:
   d. a route control process handling the inherent variations of the traffic, including determination of traffic margins, where a traffic margin for a link or node includes at least one of a flow margin, MF, and a storage margin, MS, where:
      d1. MF constitutes a margin, which is related to the difference between the flow-capacity, C, of a part of the network and the considered flow level at the same said part, and
      d2. the storage margin MS is a measure on the remaining storage possibility of TUs, which can be utilized at a part of the network,
   e. selecting flow threshold values, TFs, at various parts of the network, and comparing a TF with an estimated dynamic flow demand, DL, on the same part of the network, and for DL growing larger than TF, the difference, MD, between TF and DL will grow negative, and control processes are selectively initiated, including control of traffic margins at a part of the network according to at least one of (e1–e4);
      e1. considering the flow level TF, a corresponding MF is related to C-TF, and from that MF-level MF might be decreased, utilizing possibilities to increase the flow above TF on the said part of the network,
      e2. decreasing MS by storing TUs, utilizing possibilities to increase the input flow above the output flow,
      e3. handling peaks in DL variations, which give rise to negative MDs, by using (b1) or (b2), and utilizing possibilities to increase the respective MF or MS at smaller input flow demands,
      e4. controlling the traffic margins while dynamically increasing MD by increasing TF or changing a part of DL at the said part of the network to another part of the network,
   f. controlling the flow on the network concerning the said TF levels, and that predicted or estimated negative demand margin, MD, is detected for a first link or node on a first route for a time period, tnd, and that the traffic management system supports at least one of control of traffic margins according to (f1) and route control according to (f2);
      f1. the said negative MD is handled on the said first link or node by decreasing traffic margins for the link,
      f2. the demand margin is increased on the said first link by a process comprising an identification of a second alternative route, with estimated large enough demand margins for receiving an added sub-flow for the concerned time period, and rerouting a corresponding sub-flow to the second alternative route from the first.

20. Means according to claim 19, characterized in;
that a sensor or corresponding vehicle means are based on at least one of (a)–(i) below;

a. optical sensor based on at least one of; photo detector, video camera, camera and other opto-electronic means for detection of signals from vehicle means;
b. according to (a) where said vehicle means are constituted of blinkers;
c. according to (a) where the said signal is given at a given position or at a given situation providing a message;
d. according to (a) where the vehicle means are made as displays or other presentation units;
e. according to (d) where the presentation unit contains symbols, which indicate a part of the road network and the planned vehicle route on the road network part;
f. sensors detecting the position of vehicles on a part of a link, and where this position is related to driving directions in a downstream node;
g. the sensor is a radio receiver, receiving information from a transmitter in the vehicle;
h. according to (g) but with IR, light or acoustics as transmission media instead of radio;
i. according to (a) where a vehicle means is the vehicle license plate.

21. Means according to claim 19, characterized in;
that the control means is based on at least one of (a) to (g) below;
a. presentation means implemented at the road for information to the vehicle driver;
b. according to (a) where the presentation means contain symbols, which indicate a road network part and the given vehicle route on the road network part;
c. according to (a) where the concerned vehicle is indicated with at least a part of license plate information, e g one or more significant figures;
d. according to (a) where the information about given driving direction in downstream node is constituted of a symbol or text, e g an established arrow-symbol on a VMS;
e. the control means includes a radio transmitter, which gives information to the vehicle radio receiver;
f. according to (e) utilizing mobile telephone technology;
g. according to (e) but with IR, light or acoustics as transmission media instead of radio.

22. Means according to claim 19, characterized in;
that vehicles are equipped with at least one of the means according to (a)–(e) below;
a. navigation means, which gives the vehicle driver information about given route;
b. according to (a) where the navigation means provides a new route at deviations from the earlier;
c. according to (a) where the navigation means is updated with new control information from the traffic management system, through the driver or directly through the communication media;
d. according to (a) where the information of the navigation means about routes concerning at least the closest part of the route, is transferred to the vehicle information means, through the driver or directly through the communication media;
e. input means where the driver is putting in information about routes, concerning at least the closest part of the route, for further transfer to the vehicle information means.

23. Means for performing the method according to claim 1 in a traffic management system for traffic management on a communication network consisting of links and nodes, where individual data packets are travelling on the network according to the respective packet's route and the traffic management contains actions for controls of packets' routes, utilizing that there are more than one route from a given position on the network to a given destination, supplementing the basic means of the traffic management system with communication network based nodes and links, comprising:
a. computer units, which include processes for route control and control of traffic margins, and that central computer units for superior control of network or sub-areas alternatively can be replaced by or supplemented with distributed functions in local computer units at the nodes of the network, and that control information is communicated between computer units;
b. control means, which get information from control processes in computer units and provide route control information for further use by TUs, here data packets;
c. sensors, which obtain information about data packets at the connections with nodes, and that this information is communicated to control processes in computer units;
d. control means and sensors, which alternatively are included in local computer units,
and means for control processes comprising:
e. a route control process handling the inherent variations of the traffic, including determination of traffic margins, where a traffic margin for a link or node includes at least one of a flow margin, MF, and a storage margin, MS, where:
   e1. MF constitutes a margin, which is related to the difference between the flow-capacity, C, of a part of the network and the considered flow level at the same said part, and
   e2. the storage margin MS is a measure on the remaining storage possibility of TUs, which can be utilized at a part of the network,
f. selecting flow threshold values, TFs, at various parts of the network, and comparing a TF with an estimated dynamic flow demand, DL, on the same part of the network, and for DL growing larger than TF, the difference MD, between TF and DL will grow negative, and control processes are selectively initiated, including control of traffic margins at a part of the network according to at least one of (f1–f4):
   f1. considering the flow level TF, a corresponding MF is related to C-TF, and from that MF-level MF might be decreased, utilizing possibilities to increase the flow above TF on the said part of the network,
   f2, decreasing MS by storing TUs, utilizing possibilities to increase the input flow above the output flow,
   f3. handling peaks in DL variations, which give rise to negative MDs, by using (b1) or (b2), and utilizing possibilities to increase the respective MF or MS at smaller input flow demands,
   f4. controlling the traffic margins while dynamically increasing MD by increasing TF or changing a part of DL at the said part of the network to another part of the network,
g. controlling the flow on the network concerning the said TF levels, and that predicted or estimated negative demand margin, MD, is detected for a first link or node on a first route for a time period, tnd, and that the traffic management system supports at least one of control of traffic margins according to (g1) and route control according to (g2);
   g1. the said negative MD is handled on the said first link or node by decreasing traffic margins for the link, g2. the demand margin is increased on the said first link by a process comprising an identification of a second alternative route, with estimated large enough demand margins for receiving an added sub-flow for the concerned time period, and rerouting a corresponding sub-flow to the second alternative route from the first.

24. Means according to claim 23, characterized in;

that storage means are arranged at nodes for arriving data packets from communication links;

that control information as control packets, is sent between nodes on the network or on a control network;

that control packets, which are sent upstream opposite the direction of the data packets, deliver information to the traffic management system in upstream nodes about downstream traffic, including traffic margins.

25. Means according to claim 24, characterised is;

that storage means are arranged at nodes for arriving data packets from communication links;

that control information as control packets, is sent between nodes on the network or on a control network;

that control packets, which are sent upstream opposite the direction of the data packets, deliver information to the traffic management system in upstream nodes about downstream traffic, including traffic margins.

* * * * *